United States Patent
Kottapalli et al.

(10) Patent No.: US 11,190,364 B2
(45) Date of Patent: Nov. 30, 2021

(54) SEAMLESS CERTIFICATE REPLACEMENT FOR ENDPOINTS IN HYPERCONVERGED INFRASTRUCTURE

(71) Applicant: VMWARE, INC., Palo Alto, CA (US)

(72) Inventors: Ravi Kumar Reddy Kottapalli, Bangalore (IN); Praveen Mathamsetty, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 417 days.

(21) Appl. No.: 16/416,307

(22) Filed: May 20, 2019

(65) Prior Publication Data

US 2020/0295951 A1    Sep. 17, 2020

(30) Foreign Application Priority Data

Mar. 12, 2019    (IN) .............................. 201941009600

(51) Int. Cl.
*H04L 9/32*    (2006.01)
*H04L 29/06*    (2006.01)

(52) U.S. Cl.
CPC ........ *H04L 9/3268* (2013.01); *H04L 63/0823* (2013.01); *H04L 63/20* (2013.01)

(58) Field of Classification Search
CPC ... H04L 9/3268; H04L 63/20; H04L 63/0823; H04L 9/006; H04L 9/3263; G06F 21/33; H04W 12/069
See application file for complete search history.

(56) References Cited

U.S. PATENT DOCUMENTS

| | | | |
|---|---|---|---|
| 2005/0069136 A1* | 3/2005 | Thornton | H04L 63/20 380/277 |
| 2008/0016337 A1* | 1/2008 | Morgan | H04L 9/0825 713/158 |
| 2011/0219227 A1* | 9/2011 | Sharif | G06F 21/33 713/158 |
| 2018/0262487 A1* | 9/2018 | Zaifman | H04L 63/0823 |

OTHER PUBLICATIONS

Marianne A. Azer et al.,"Certificate and Revocation Schemes in Ad Hoc Networks Survey and Challenged,", pp. 1-6. (Year: 2007).*
Alessandro Cilardo et al, "Performance Evaluation of Security Services: An Experimental Approach," 2007, pp. 1-8. (Year: 2007).*

* cited by examiner

*Primary Examiner* — Luu T Pham
*Assistant Examiner* — Canh Le

(57) ABSTRACT

Techniques for seamless certificate replacement for endpoints in hyperconverged infrastructure are disclosed. In one example, a certificate replacement request for an endpoint may be received. Upon receiving the certificate replacement request, a new certificate may be placed in the endpoint such that the endpoint includes an old certificate and the new certificate. Further, dependent endpoints having communication with the endpoint using the old certificate may be discovered and monitored. Furthermore, the new certificate of the endpoint may be placed in the discovered dependent endpoints and existing communication between the endpoint and each of the discovered dependent endpoints using the old certificate may be maintained. Upon completion of the existing communication, next communication between the endpoint and each of the discovered dependent endpoints may be enabled using the new certificate. Then, the old certificate may be decommissioned from the endpoint and the discovered dependent endpoints.

18 Claims, 6 Drawing Sheets

FIG. 4A

| | CERTIFICATE DEPENDENT NODES 404 | | | | |
|---|---|---|---|---|---|
| CERTIFICATE REPLACEMENTS NODES 402 | | 104A | 104B | 104C | 104D | COUNT 406 |
| | 104A | 0 | 1 | 1 | 1 | 3 |
| | 104B | 0 | 0 | 0 | 0 | 0 |
| | 104C | 0 | 0 | 0 | 0 | 0 |
| | 104D | 0 | 0 | 0 | 0 | 0 |

FIG. 4B

| | CERTIFICATE DEPENDENT NODES 404 | | | | |
|---|---|---|---|---|---|
| CERTIFICATE REPLACEMENTS NODES 402 | | 104A | 104B | 104C | 104D | COUNT 406 |
| | 104A | 0 | 0 ~408 | 1 | 1 | 2 ~410 |
| | 104B | 0 | 0 | 0 | 0 | 0 |
| | 104C | 0 | 0 | 0 | 0 | 0 |
| | 104D | 0 | 0 | 0 | 0 | 0 |

FIG. 4C

| | CERTIFICATE DEPENDENT NODES 404 | | | | |
|---|---|---|---|---|---|
| CERTIFICATE REPLACEMENTS NODES 402 | | 104A | 104B | 104C | 104D | COUNT 406 |
| | 104A | 0 | 0 | 0 | 0 | 0 |
| | 104B | 0 | 0 | 0 | 0 | 0 |
| | 104C | 0 | 0 | 0 | 0 | 0 |
| | 104D | 0 | 0 | 0 | 0 | 0 |

SEAMLESS CERTIFICATE REPLACEMENT FOR ENDPOINTS IN HYPERCONVERGED INFRASTRUCTURE

RELATED APPLICATIONS

Benefit is claimed under 35 U.S.C. 119(a)-(d) to Foreign Application Serial No. 201941009600 filed in India entitled "SEAMLESS CERTIFICATE REPLACEMENT FOR ENDPOINTS IN HYPERCONVERGED INFRASTRUCTURE", on Mar. 12, 2019, by VMWARE, INC., which is herein incorporated in its entirety by reference for all purposes.

TECHNICAL FIELD

The present disclosure relates to hyperconverged infrastructure environments, and more particularly to methods, techniques, and systems for certificate replacement in hyperconverged infrastructure environments.

BACKGROUND

In software defined data centers (SDDCs) with hyperconverged infrastructure, networking, storage, processing, and security may be virtualized and delivered as a service (e.g., referred to as "Infrastructure as a Service"). The term "hyperconverged infrastructure" may refer to a rack-based system that combines compute, storage and networking components into a single system to reduce data center complexity and increase scalability. In such SDDCs, the deployment, provisioning, configuration, and operation of the entire network infrastructure may be abstracted from hardware and implemented using software. Further, the SDDC may include multiple clusters of physical servers and each cluster may execute SDDC components. For example, the SDDC components may include monitoring and management applications/services corresponding to network virtualization, server virtualization, storage virtualization, and the like.

However, the SDDC components may be exposed to a risk of various attacks as the applications communicate data via a network (e.g., Internet). To avoid such attacks, SDDC components may include various authentication mechanisms and security protocols to allow SDDC components to trust one another and to allow users to sign on to access the functions provided by each SDDC component. An example authentication mechanism may use digital certificates in the SDDC components for data communications.

BRIEF DESCRIPTION OF THE DRAWINGS

FIGS. 4A-4C depict an example certificate dependency table, depicting a certificate dependency count for the endpoint;

Figure 1:
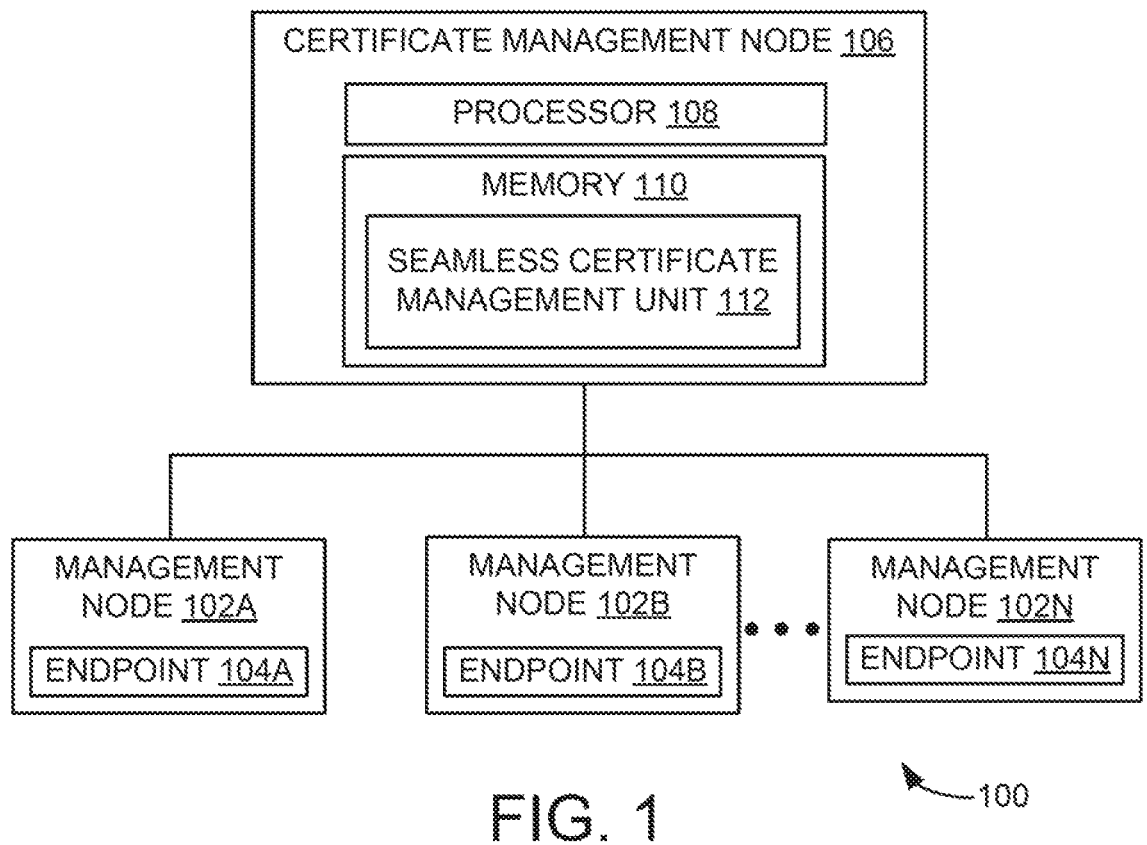
FIG. 1 is a block diagram of an example software defined data center (SDDC), including a seamless certificate management unit to perform certificate replacement for an endpoint in a hyperconverged infrastructure.

The drawings described herein are for illustration purposes only and are not intended to limit the scope of the present subject matter in any way.

DETAILED DESCRIPTION

Examples described herein may provide an enhanced computer-based and network-based method, technique, and system for seamless certificate replacement for endpoints in software defined data centers (SDDCs) with hyperconverged infrastructure. An SDDC may include multiple clusters of physical servers and each cluster may be a policy-based resource container with specific availability and performance attributes that combines compute (e.g., vSphere of VMware®), storage (vSAN of VMware®), and networking (e.g., NSX of VMware®) into a single consumable entity via different applications. For example, each cluster may correspond to one workload domain of the SDDC. The workload domain may be deployed in a virtual server rack, which may include the cluster of physical servers located across a plurality of physical racks. In another example, the workload domain may be deployed in a single physical rack.

In some examples, data associated with SDDC components (hereinafter refer to as endpoints) may be secured using digital certificates to avoid a risk of various attacks as the applications communicate data via networks (e.g., Internet). Example endpoints may include platform services controller (PSC), vCenter (VC), NSX (a network virtualization and security platform), and the like that are offered by VMware. A digital certificate may allow the applications to exchange data securely over the Internet using a public key infrastructure (PKI). The digital certificate may include information about the public key, information about the identity of its owner (e.g., a subject), and the digital signature of an entity that has verified the certificate's contents (e.g., an issuer).

In some examples, there can be various endpoints that are communicating with each other in the SDDCs with hyperconverged infrastructure. In such a scenario, customers may expect zero downtime during certificate management operations, such as certificate replacement and revocations, for the endpoints. Example certificate management operations on endpoints may include certificate signing request (CSR) generation, certificate generation, certificate replacement, certificate view, trust relationship view, re-trust-relationships, certificate health view, and so on.

However, introducing certificates may also introduce the problem of certificate management, as certificates may expire over time and/or may need to be replaced with an updated certificate. In a product deployment that uses PKI or similar policies to perform some of its functions, it may be assumed that that the product relies on an administrator to manually manage the certificate lifecycle. In some cases, such assumption may often lead to loss of functionality and the endpoints that cannot communicate correctly to provide the expected functions.

Some existing certificate management services may perform certificate replacement and re-trust via certificate replacement and re-trust application programming interfaces (APIs) which can be consumed by the certificate management services to orchestrate replacement and re-trust across the endpoints. For example, consider a first endpoint and a second endpoint having certificates "A1" and "B1", respectively. Also, consider a scenario where the administrator may require or demand to do the certificate replacement for the second endpoint. In this example, existing methods may perform the following sequence of flows for the certificate replacement at the second endpoint:

Take a snapshot of the second endpoint along with old certificate "B1".
In case, if certificate replacement fails, revert the snapshot.
Administrator to initiate the certificate replacement for the second endpoint. Now the second endpoint may include new certificate called "B1-new".
  a. Snapshot of the second endpoint will have old certificate B1
Identify the second endpoint associated objects and push the new certificate into those objects.
In the above example, push the second endpoint new certificate (B1-new) to the first endpoint.
In order to have communication, the first endpoint will re-establish the Secure Sockets Layer (SSL) trust to the second endpoint with the new certificate "B1-new".

However, the above-mentioned method may have the following drawbacks:

As soon as the certificate replacement happened for the second endpoint, the existing SSL trust between the second endpoint to all its associated other endpoints will be broken.
Consider, the second endpoint may have association with 10 other endpoints in the SDDC. As soon as the certificate replacement happens for the second endpoint, the SSL trust from the second endpoint to other 10 endpoints can be broken. This may impact the current communication path from the second endpoint to all other endpoints.
The impact may depend on a time interval window that corresponds to the new certificate of the second endpoint being successfully placed in the other endpoints.
This time interval window or certificate replacement window time may depend on the number of endpoints that has association with the second endpoint. If the number of endpoints that are associated with the second endpoint is more, then the certificate replacement window time can be more. This certificate replacement window time may be the downtime for the existing communication between the second endpoint to the other endpoints.
In significantly large SDDCs, the certificate replacement window time (i.e., downtime for the communication between the endpoints) may be significantly high and impact existing communication between the endpoints.

Examples described herein may provide a seamless certificate management unit to perform seamless certificate replacement for endpoints with zero down time without breaking the existing SSL trust between the associated endpoints. In one example, the seamless certificate management unit may receive a certificate replacement request for an endpoint in a hyperconverged infrastructure, place a new certificate in the endpoint upon receiving the certificate replacement request such that the endpoint includes an old certificate and the new certificate, discover and monitor one or more dependent endpoints having communication with the endpoint using the old certificate, and place the new certificate in the discovered dependent endpoints while maintaining existing communication between the endpoint and each of the discovered dependent endpoints using the old certificate. Upon completion of the existing communication, the seamless certificate management unit may enable next communication between the endpoint and each of the discovered dependent endpoints using the new certificate and decommission the old certificate from the endpoint and the discovered dependent endpoints.

Thus, examples described herein may not break the existing SSL trust between any entities so existing data connections can continue working without any data loss. Examples described herein may provide a smooth transition from the old certificate to the new certificate without any downtime. Examples described herein may be suitable for large scale deployments such as VMware Cloud Foundation™, which is commercially available from VMware.

The terms "endpoint", "centralized management application", "centralized management service", and "SDDC component" are used interchangeably throughout the document and may refer to monitoring and managing applications/services of the SDDCs. Further, the seamless certificate management unit may run in a VM, a container, or a physical server in the SDDC to provide seamless certificate replacement for the SDDC components.

System Overview and Examples of Operation

FIG. 1 is a block diagram of an example SDDC 100, including a seamless certificate management unit 112 to perform certificate replacement for an endpoint in a hyperconverged infrastructure. SDDC 100 may be a data storage facility in which infrastructure elements such as networking, storage, central processing unit (CPU), security and the like can be virtualized and delivered as a service in cloud computing environments. Cloud computing may be based on the deployment of physical resources across a network, virtualizing the physical resources into virtual resources, and provisioning the virtual resources in SDDCs for use across cloud computing services and applications. Further, SDDCs can be implemented using a hyperconverged infrastructure. Hyperconverged infrastructure may combine a virtualization platform such as a hypervisor, virtualized software-defined storage, and virtualized networking in an SDDC deployment. An example platform to deploy and manage the SDDCs may include VMware Cloud Foundation™ (VCF), which is commercially available from VMware.

As shown in FIG. 1, SDDC 100 may include a cluster of management nodes 102A-102N executing a respective one of centralized management services (e.g., hereinafter referred to as endpoints 104A-104N), which can be dependent on each other. In one example, management nodes 102A-102N may be distributed across multiple sites (e.g., separate geographical locations). Example management nodes 102A-102N may be virtual machines, containers, servers, or any combination thereof. Each endpoint 104A-104N may be a centralized management application to centrally manage virtual machines and physical servers in SDDC 100. In some systems with distributed management, the servers may be statically allocated among the management nodes 102A-102N.

Example centralized management services/endpoints 104A-104N may be a part of vCenter Server™ and vSphere® program products, which are commercially available from VMware. Example endpoints 104A-104N may include virtual machine provisioning service (e.g., to guide and automate the provisioning of virtual machines and their resources), resources and virtual machine inventory management service (e.g., to organize virtual machines and resources in the virtual environment and facilitates their management), alarms and event management service (e.g., to track and warn users on potential resource overuse or event conditions), and the like. In other examples, endpoints 104A-104N can include directory services, domain name services, dynamic host configuration protocol services, and services such as those performed by VMware products, for example, VMware vCenter Server™, VMware vRealize® Operations™, VMware Site Recovery Manager™, vRealize Network Insight™ and vRealize Log Insight™, PSC, VC, NSX, or any combination thereof.

In some examples, the cluster may include a dedicated group of servers (i.e., host computing systems) reserved for running virtual machines that provide endpoints 104A-104N to infrastructure environments. For example, endpoints 104A-104N may be executed in the virtual machines that run on a same server or different servers. In SDDC 100, a cluster of management nodes 102A-102N running endpoints 104A-104N may be communicatively coupled together and act as a single platform for managing the virtualization infrastructure and deploying virtual machines.

Further, SDDC 100 may include a certificate management node 106 communicatively coupled to management nodes 102A-102N that execute endpoints 104A-104N, respectively. It should be appreciated that certificate management node 106 may be implemented in a computing device, either virtual or physical, within SDDC 100, and is communicatively coupled to management nodes 102A-102N via a network (e.g., Wi-Fi, WiMAX, local area network (LAN), wide area network (WAN), metropolitan area network, Internet network, fixed wireless network, a wireless LAN, wireless WAN, personal area network (PAN), virtual private network (VPN), intranet, or the like).

In one example, certificate management node 106 may include a processor 108 and memory 110 coupled to processor 108. Further, memory 110 may include seamless certificate management unit 112. In other examples, seamless certificate management unit 112 may also be implemented within one or more of management nodes 102A through 102N.

During operation, seamless certificate management unit 112 may receive a certificate replacement request for an endpoint (e.g., 104A) in the hyperconverged infrastructure. The certificate replacement request for an endpoint may be received via a Representational State Transfer (REST) or Simple Object Access Protocol (SOAP) API call.

In some examples, seamless certificate management unit 112 may take a snapshot of the endpoint (e.g., 104A) along with the old certificate substantially upon receiving the certificate replacement request. In this case, seamless certificate management unit 112 may instantiate a recovery of the endpoint (e.g., 104A) with the old certificate by reverting the snapshot when the certificate replacement request fails.

Further, seamless certificate management unit 112 may place a new certificate in the endpoint (e.g., 104A) upon receiving the certificate replacement request such that the endpoint (e.g., 104A) includes both an old certificate and the new certificate. For example, each of the old certificate and the new certificate may be a digital certificate that enable secure data communications between endpoints 104A-104N via networks (e.g., Internet). Example digital certificate may be a Secure Sockets Layer (SSL) certificate, a Transport Layer Security (TLS) certificate, or the like.

Furthermore, seamless certificate management unit 112 may discover and monitor one or more dependent endpoints (e.g., 104B-104N) having communication with the endpoint (e.g., 104A) using the old certificate. Also, seamless certificate management unit 112 may place the new certificate in the discovered dependent endpoints (e.g., 104B-104N) while maintain existing communication between the endpoint (e.g., 104A) and each of the discovered dependent endpoints (e.g., 104B-104N) using the old certificate. In one example, seamless certificate management unit 112 may establish a trust between the endpoint (e.g., 104A) and each of the discovered dependent endpoints (e.g., 104B-104N) using the new certificate via placing the new certificate in the discovered dependent endpoints (e.g., 104B-104N).

Seamless certificate management unit 112 may determine completion of the existing communication between the endpoint (e.g., 104A) and each of the discovered dependent endpoints (e.g., 104B-104N) using the old certificate and enable next communication between the endpoint (e.g., 104A) and each of the discovered dependent endpoints (e.g., 104B-104N) using the new certificate upon completion of the existing communication. Then, seamless certificate management unit 112 may decommission the old certificate from the endpoint (e.g., 104A) and the discovered dependent endpoints (e.g., 104B-104N).

In one example implementation, seamless certificate management unit 112 may dynamically create and maintain a certificate dependency table based on discovering and monitoring of the one or more dependent endpoints (e.g., 104B-104N). In alternate examples, the certificate dependency table can also be created and updated using machine learning techniques. The certificate dependency table may include:

1. Dependency information between the endpoint 104A and the discovered dependent endpoints (e.g., 104B-104N) using the old certificate.
2. A dependency count including a number of the discovered dependent endpoints that are communicating with the endpoint with the old certificate.

In the above example, seamless certificate management unit 112 may determine the completion of the existing communication between the endpoint (e.g., 104A) and each of the discovered dependent endpoints (e.g., 104B-104N) using the certificate dependency table, and enable the next communication between the endpoint (e.g., 104A) and each of the discovered dependent endpoints (e.g., 104B-104N) using the new certificate upon completion of the existing communication.

In one example, seamless certificate management unit 112 may perform the certificate replacement for the endpoint (e.g., 104A) using the certificate dependency table as follows:

Determine that the existing communication between the endpoint (e.g., 104A) and a first dependent endpoint (e.g., 104B) of the discovered dependent endpoints (e.g., 104B-104N) using the old certificate is completed based on the monitoring.

Update the dependency count in the certificate dependency table and enable the next communication between the endpoint (e.g., 104A) and the first dependent endpoint (e.g., 104B) using the new certificate upon determining that the existing communication between the endpoint (e.g., 104A) and the first dependent endpoint (e.g., 104B) is completed. The old certificate can be decommissioned from the first dependent endpoint (e.g., 104B).

Determine whether the updated dependency count becomes zero.

When the dependency count is greater than zero, repeat the above steps for a next dependent endpoint (e.g., 104C) of the discovered dependent endpoints (e.g., 104B-104N).

Decommission the old certificate from the endpoint (e.g., 104A) when the dependency count becomes zero.

Thus, examples described herein may perform seamless certificate replacement for endpoints 104A-104N with zero down time without breaking the existing SSL trust between the associated endpoints. In some examples, the functionalities of seamless certificate management unit 112 can be implemented as a part of a certificate management service in hyperconverged infrastructures as shown in FIG. 2.

Figure 2:
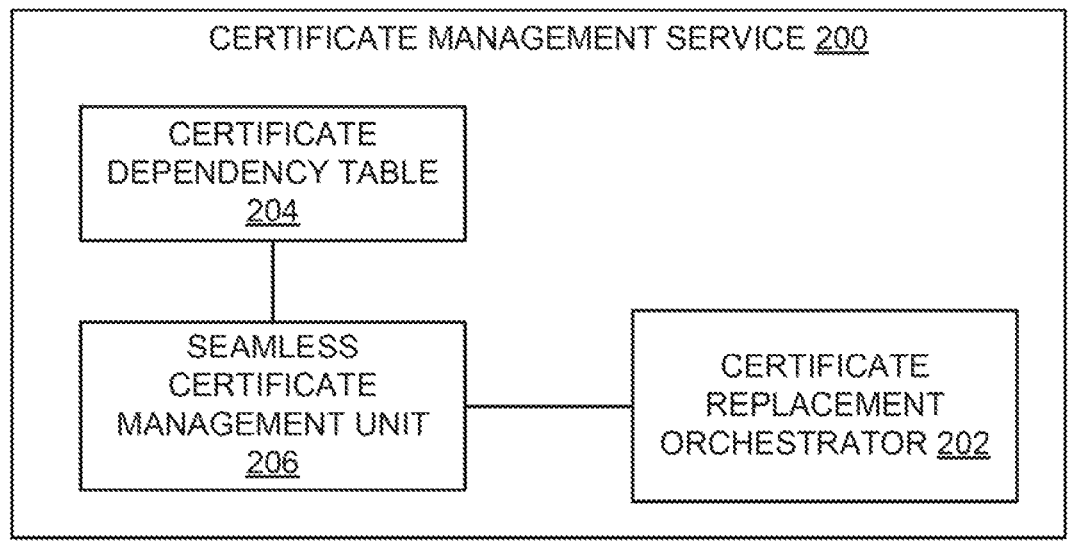
FIG. 2 depicts an example certificate management service including the seamless certificate management unit, such as those shown in FIG. 1.

FIG. 2 depicts an example certificate management service 200 including a seamless certificate management unit 206 (e.g., such as seamless certificate management unit 112 of FIG. 1). Certificate management service 200 may be a standalone service that can run on any virtual machine (VM). Example VM may be SDDC Manager Controller VM in case of VMware Cloud Foundation™, which is commercially available from VMware. The SDDC Manager Controller VM may include logic for deploying the software stack, managing workload domains, managing hardware tasks, and performing lifecycle management to ensure the software components remain up-to-date. Certificate management service 200 may be started as a service which exposes REST API for managing certificates across all endpoints (i.e., SDDC components). Administrator can use command-line interface (CLI) commands to interact with certificate management service 200.

As shown in FIG. 2, certificate management service 200 may include a certificate replacement orchestrator 202, a certificate dependency table 204, and seamless certificate management unit 206 communicatively coupled to certificate replacement orchestrator 202 and certificate dependency table 204. Certificate replacement orchestrator 202 may orchestrate certificate replacement across the endpoints. Certificate replacement orchestrator 202 may persist the certificate replacement task states in the database. Administrator can be able to view the task states and retry the failed tasks.

As shown in FIG. 2, seamless certificate management unit 206 can be implemented as a part of certificate management service 200. Certificate replacement orchestrator 202 may instruct the seamless certificate management unit 206 to perform the certificate replacement for a particular endpoint (e.g., VC, NSX, PSC, or the like) without impacting or breaking the SSL trust between the endpoints. During operation, seamless certificate management unit 206 may dynamically create and maintain certificate dependency table 204. Certificate dependency table 204 may maintain the current certificate dependency of the endpoints in the hyperconverged infrastructure. Further, seamless certificate management unit 206 may handle the seamless certificate replacement without breaking the SSL trust among the endpoints using the certificate dependency table 204. The functions of seamless certificate management unit 206, certificate dependency table 204, and certificate replacement orchestrator 202, and also the interactions between the endpoints may be explained with respect to FIGS. 3 and 4A-4C.

Figure 3:
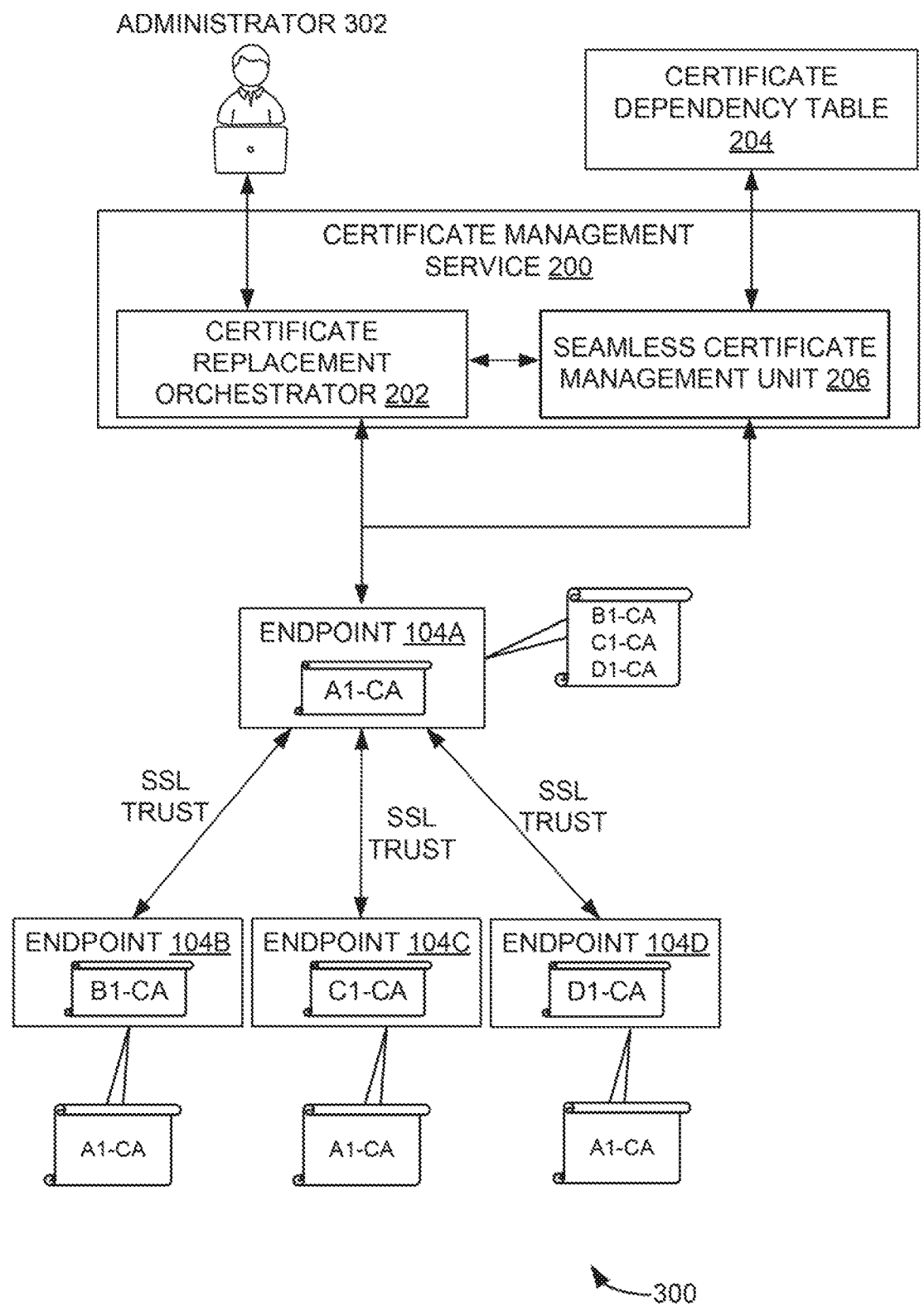
FIG. 3 is a block diagram of an example SDDC, including a seamless certificate management unit to perform certificate replacement for an endpoint using a certificate dependency table.

FIG. 3 is a block diagram of an example SDDC 300 (e.g., such as SDDC 100 of FIG. 1), including seamless certificate management unit 206 to perform certificate replacement for an endpoint 104A using certificate dependency table 204. For example, similarly named elements of FIG. 3 may be similar in structure and/or function to elements described with respect to FIG. 2.

In the example shown in FIG. 3, SDDC 300 may include four endpoints (104A to 104D). Example endpoints 104A-104D may be SDDC components such as PSC, VC, NSX, and the like. Further as shown in FIG. 3, certificates "A1-CA", "B1-CA", "C1-CA", and "D1-CA" are certificate authority (CA) signed trusted certificates of endpoints 104A-104D, respectively. Further, endpoints 104B, 104C, and 104D may have SSL trust with respect to endpoint 104A. Therefore, endpoints 104B, 104C, and 104D may maintain certificate "A1-CA" of endpoint 104A in associated certificate stores. Similarly, certificate store of endpoint 104A can include certificates B1-CA, C1-CA, and D1-CA of endpoints 104B, 104C, and 104D, respectively.

Administrator 302 may interact with certificate replacement orchestrator 202 using, for instance, the REST API calls for placing certificate management operations such as certificate replacement, certificate revocation, or the like. Upon receiving the request from administrator 302, certificate replacement orchestrator 202 may instruct seamless certificate management unit 206 to handle the request given by administrator 302. Upon receiving instructions from certificate replacement orchestrator 202, seamless certificate management unit 206 may perform the certificate replacement of any endpoint without breaking the existing SSL trust between the endpoints and by re-establishing the trust with the new certificate with zero downtime.

In the example shown in FIG. 1, consider that administrator 302 requested to do the certificate replacement for endpoint 104A. In this example, administrator 302 may place the certificate replacement request for endpoint 104A using REST API call to the certificate replacement orchestrator 202. Further, certificate replacement orchestrator 202 may in turn instruct seamless certificate management unit 206 to handle the certificate replacement request for endpoint 104A. Let us consider that "A2-CA" is the new certificate that is going to replace the old certificate "A1-CA".

Upon receiving certificate replacement request from certificate replacement orchestrator 202, seamless certificate management unit 206 may initiate a snapshot request for endpoint 104A along with old certificate "A1-CA". Further, seamless certificate management unit 206 may place the new certificate "A2-CA" in endpoint 104A. Now, endpoint 104A may include both certificates A1-CA and A2-CA. However, endpoints 104B, 104C, and 104D still maintain the SSL trust with endpoint 104A with the old certificate "A1-CA".

In this case, endpoint 104A is referred to as a certificate replacement node and endpoints 104B, 104C, and 104D are referred to as certificate dependent nodes. Seamless certificate management unit 206 may discover the certificate dependent nodes (i.e., endpoints 104B, 104C, and 104D) of endpoint 104A and dynamically update the certificate dependency table 204 as soon as the certificate replacement node (i.e., endpoint 104A) is identified. Also, seamless certificate management unit 206 may place endpoint 104A's new certificate "A2-CA" in certificate stores associated with discovered endpoints 104B, 104C, and 104D. Now, endpoints 104B, 104C, and 104D may include both old and new certificates A1-CA and A2-CA of endpoint 104A in associated certificate stores.

An example certificate dependency table 204 that is built by seamless certificate management unit 206 for endpoint 104A is depicted in FIG. 4A. As shown in FIG. 4A, any endpoint can become certificate dependent node or certificate replacement node. Therefore, all the nodes can be presented in X-axis (i.e., as certificate replacement nodes 402) and Y-axis (i.e., as certificate dependent nodes 404).

Using the certificate dependency table 204 as shown in FIG. 4A, seamless certificate management unit 206 may construct and update certificate dependencies between endpoints at any instance. Using certificate dependency table 204 of FIG. 4A, seamless certificate management unit 206 can derive the following information:

1. Endpoint 104A is a certificate replacement node and has SSL trust with endpoints 104B, 104C, and 104D respectively.
2. Total active certificate dependency count 406 on endpoint 104A is 3 with old certificate "A1-CA" of endpoint 104A.

When the total active certificate dependency count 406 on endpoint 104A is not 0 (e.g., as shown in certificate dependency table 204 of FIG. 4B), then seamless certificate management unit 206 will handle the certificate replacement as follows. Endpoint 104B to endpoint 104A communication with old certificate (A1-CA) is completed (i.e., SSL trust is over as shown by 408) and hence the channel is free and now the certificate dependency count 406 become 2 (e.g., as shown by 410). Seamless certificate management unit 206 may ensure that any further communication between endpoint 104A to endpoint 104B or endpoint 104B to endpoint 104A can happen over new certificate (A2-CA), thereby ensuring from now on any further communication between endpoint 104A and endpoint 104B happen with new SSL trust and with new certificate (A2-CA). Seamless certificate management unit 206 may decommission or remove the old certificate (A1-CA) of endpoint 104A from endpoint 104B's certificate store. Therefore, endpoint 104B certificate store may have only endpoint 104A's new certificate (A2-CA) upon decommissioning old certificate (A1-CA).

Further, seamless certificate management unit 206 may repeat the above process for handling the certificate replacement for all the remaining certificate dependent nodes (e.g., 104C and 104D) until the certificate dependency count 406 becomes zero. In one example, when the total active certificate dependency count 406 on endpoint 104A is or becomes 0 (e.g., as shown in certificate dependency table 204 of FIG. 4C), seamless certificate management unit 206 may decommission or delete old certificate (A1-CA) from certificate store of endpoint 104A. From this point onwards, re-trust or new SSL communication can happen between endpoints 104B-104D and endpoint 104A with new certificate (A2-CA). Thus, seamless certificate management unit 206 may handle the certificate replacement with zero downtime and without breaking the old SSL trust (i.e., transition from the old certificate to the new certificate does not break communication between the endpoints).

In some examples, the functionalities described herein, in relation to instructions to implement functions of seamless certificate management unit (e.g., 112 of FIG. 1 or 206 of FIGS. 2 and 3), certificate replacement orchestrator 202, and any additional instructions described herein in relation to the storage medium, may be implemented as engines or modules including any combination of hardware and programming to implement the functionalities of the modules or engines described herein. The functions of seamless certificate management unit 112 or 206 and certificate replacement orchestrator 202 may also be implemented by respective processors. In examples described herein, each processor may include, for example, one processor or multiple processors included in a single device or distributed across multiple devices.

The examples described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Example Processes

Figure 5:
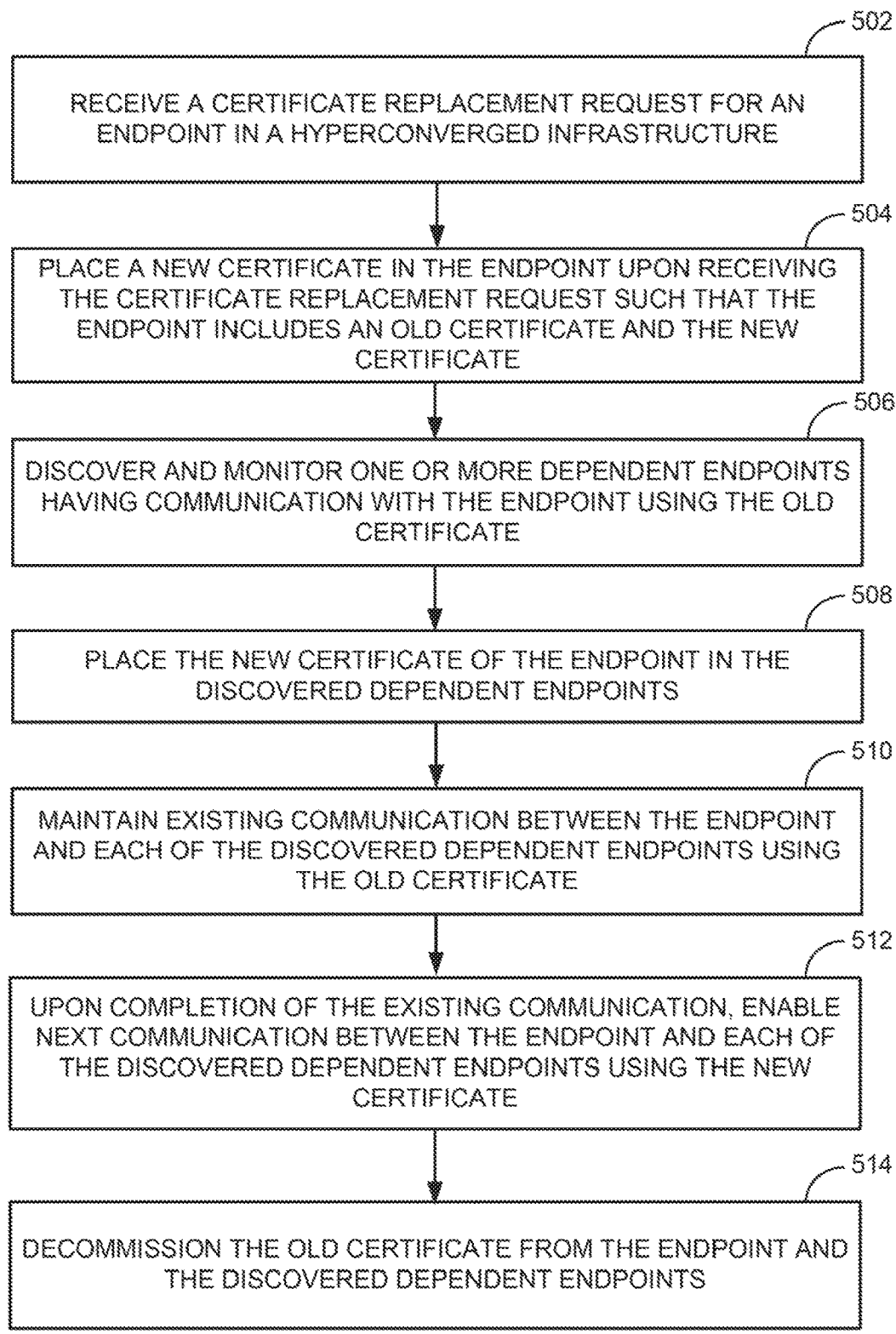
FIG. 5 is an example flow diagram of a method for performing certificate replacement for an endpoint in a hyperconverged infrastructure.

FIG. 5 is an example flow diagram 500 of a method for performing certificate replacement for an endpoint in a hyperconverged infrastructure. It should be understood that the process depicted in FIG. 5 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 502, a certificate replacement request may be received for an endpoint in a hyperconverged infrastructure. At 504, a new certificate may be placed in the endpoint (e.g., in a certificate store of the endpoint) upon receiving the certificate replacement request such that the endpoint includes an old certificate and the new certificate.

At 506, one or more dependent endpoints having communication with the endpoint using the old certificate may be discovered and monitored. At 508, the new certificate of the endpoint may be placed in the discovered dependent endpoints. In one example, placing the new certificate of the endpoint in the discovered dependent endpoints may establish a trust between the endpoint and each of the discovered dependent endpoints using the new certificate. In one example, each of the endpoint and the dependent endpoints is an SDDC component and may run in a same management node or a different management node (e.g., a virtual machine, a container, or a physical server).

At 510, existing communication between the endpoint and each of the discovered dependent endpoints may be maintained using the old certificate. Upon completion of the existing communication, at 512, next communication between the endpoint and each of the discovered dependent endpoints may be enabled using the new certificate. At 514, the old certificate may be decommissioned from the endpoint and the discovered dependent endpoints. An example method to decommission the old certificate from the endpoint and the discovered dependent endpoints is explained in FIG. 6.

Figure 6:
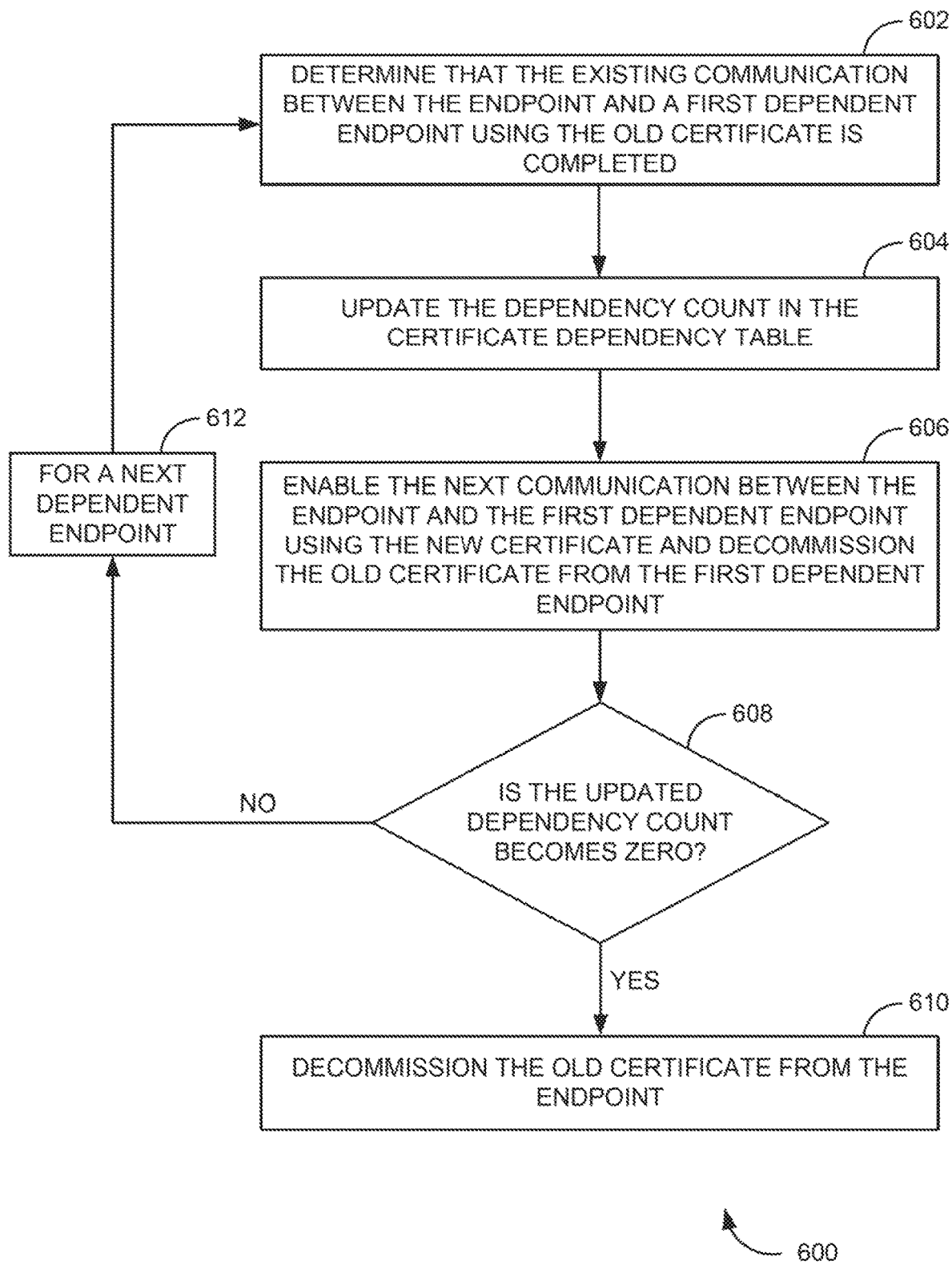
FIG. 6 is another example flow diagram of a method for performing certificate replacement for the endpoint using a certificate dependency table.

FIG. 6 is an example flow diagram 600 of a method for performing certificate replacement for an endpoint using a certificate dependency table. It should be understood that the process depicted in FIG. 6 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

The certificate dependency table may include dependency information between the endpoint and the discovered dependent endpoints using the old certificate, and a dependency count including a number of the discovered dependent endpoints that are communicating with the endpoint with the old certificate. The certificate dependency table may be dynamically created and maintained based on discovering and monitoring of the one or more dependent endpoints. In this example, the completion of the existing communication between the endpoint and each of the discovered dependent endpoints may be determined using the certificate dependency table and the next communication between the endpoint and each of the discovered dependent endpoints may be enabled using the new certificate upon completion of the existing communication as shown in blocks 602 to 612.

At 602, completion of the existing communication between the endpoint and a first dependent endpoint of the discovered dependent endpoints using the old certificate may be determined based on the monitoring of the dependent endpoints. Upon determining that the existing communication between the endpoint and the first dependent endpoint is completed, the dependency count may be updated in the certificate dependency table (e.g., at 604), the next communication between the endpoint and the first dependent endpoint may be enabled using the new certificate and the old certificate can be decommissioned from the first dependent endpoint (e.g., at 606).

At 608, a check may be made to determine whether the updated dependency count becomes zero. When the updated dependency count is greater than zero, the process 600 may identify a next dependent endpoint of the discovered dependent endpoints (e.g., at 612) and may repeat steps 602-608 for the next dependent endpoint. When the dependency count is zero, at 610, the old certificate may be decommissioned from the endpoint. In this example, the dependency count of zero may indicate that the dependent endpoints are not in communication with the endpoint using the old certificate.

Figure 7:
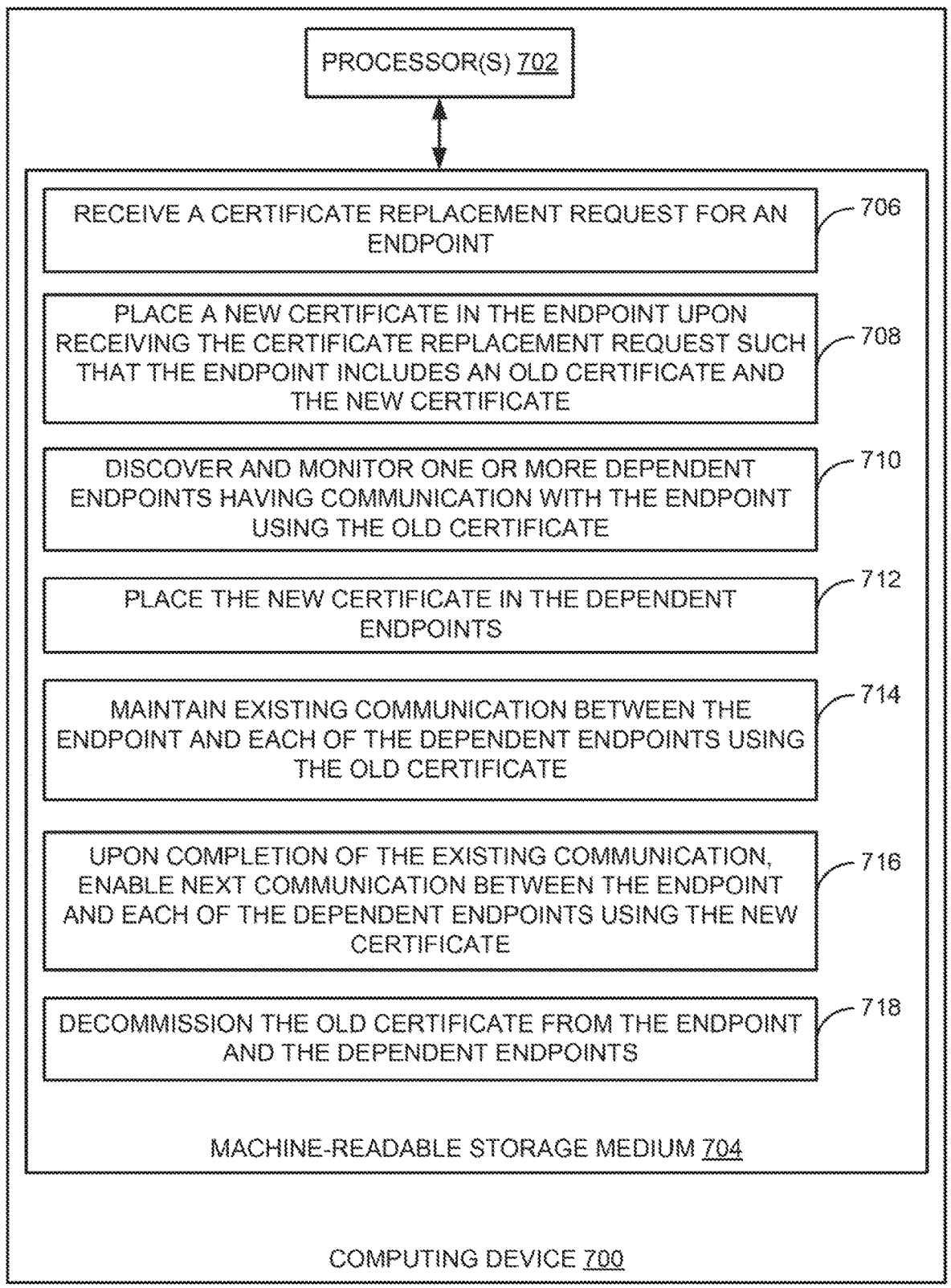
FIG. 7 is a block diagram of an example computing system including a non-transitory computer-readable storage medium, storing instructions to perform certificate replacement for an endpoint.

FIG. 7 is a block diagram of an example computing device 700 including non-transitory machine-readable storage medium 704, storing instructions to perform certificate replacement for an endpoint. Computing device 700 may include a processor 702 and machine-readable storage medium 704 communicatively coupled through a system bus. Processor 702 may be any type of central processing unit (CPU), microprocessor, or processing logic that interprets and executes machine-readable instructions stored in machine-readable storage medium 704. Machine-readable storage medium 704 may be a random-access memory (RAM) or another type of dynamic storage device that may store information and machine-readable instructions that may be executed by processor 702. For example, machine-readable storage medium 704 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 704 may be a non-transitory machine-readable medium. In an example, machine-readable storage medium 704 may be remote but accessible to computing device 700.

Machine-readable storage medium 704 may store instructions 706-718. In an example, instructions 706-718 may be executed by processor 702 to perform certificate replacement for the end point in the SDDC with the hyperconverged infrastructure. Instructions 706 may be executed by processor 702 to receive a certificate replacement request for the endpoint in the hyperconverged infrastructure. Instructions 708 may be executed by processor 702 to place a new certificate in the endpoint upon receiving the certificate replacement request such that the endpoint includes an old certificate and the new certificate.

Instructions 710 may be executed by processor 702 to discover and monitor one or more dependent endpoints having communication with the endpoint using the old certificate. Instructions 712 may be executed by processor 702 to place the new certificate in the dependent endpoints. Instructions 714 may be executed by processor 702 to maintain existing communication between the endpoint and each of the dependent endpoints using the old certificate.

Upon completion of the existing communication, instructions 716 may be executed by processor 702 to enabling next communication between the endpoint and each of the dependent endpoints using the new certificate. Instructions 718 may be executed by processor 702 to decommission the old certificate from the endpoint and the dependent endpoints.

Some or all of the system components and/or data structures may also be stored as contents (e.g., as executable or other machine-readable software instructions or structured data) on a non-transitory computer-readable medium (e.g., as a hard disk; a computer memory; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques.

Examples described in FIGS. 1-7 can be implemented in vCenter Server™ and vSphere® program products, which are commercially available from VMware. Examples described herein can also be implemented in vRealize Automation®, vRealize Operations, vRealize Business, vCloud Automation Center, and/or the like that are offered by VMware.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A method comprising:
receiving a certificate replacement request for an endpoint in a hyperconverged infrastructure;
placing a new certificate in the endpoint upon receiving the certificate replacement request such that the endpoint includes an old certificate and the new certificate;
discovering and monitoring one or more dependent endpoints having communication with the endpoint using the old certificate;
placing the new certificate of the endpoint in the discovered dependent endpoints, wherein placing the new certificate of the endpoint in the discovered dependent endpoints comprises:
establishing a trust between the endpoint and each of the discovered dependent endpoints using the new certificate;
maintaining existing communication between the endpoint and each of the discovered dependent endpoints using the old certificate;
upon completion of the existing communication, enabling next communication between the endpoint and each of the discovered dependent endpoints using the new certificate; and
decommissioning the old certificate from the endpoint and the discovered dependent endpoints.

2. The method of claim 1, further comprising:
dynamically creating and maintaining a certificate dependency table based on discovering and monitoring of the one or more dependent endpoints, the certificate dependency table is to include:
dependency information between the endpoint and the discovered dependent endpoints using the old certificate; and
a dependency count including a number of the discovered dependent endpoints that are communicating with the endpoint with the old certificate.

3. The method of claim 2, wherein enabling the next communication between the endpoint and each of the discovered dependent endpoints using the new certificate comprises:
determining the completion of the existing communication between the endpoint and each of the discovered dependent endpoints using the certificate dependency table; and
enabling the next communication between the endpoint and each of the discovered dependent endpoints using the new certificate upon completion of the existing communication.

4. The method of claim 2, wherein enabling the next communication between the endpoint and each of the discovered dependent endpoints using the new certificate comprises:
a. determining that the existing communication between the endpoint and a first dependent endpoint of the discovered dependent endpoints using the old certificate is completed based on the monitoring;
b. upon determining that the existing communication between the endpoint and the first dependent endpoint is completed, updating the dependency count in the certificate dependency table and enabling the next communication between the endpoint and the first dependent endpoint using the new certificate, wherein the old certificate can be decommissioned from the first dependent endpoint; and
c. determining whether the updated dependency count becomes zero; and
when the dependency count is greater than zero, repeating the steps a, b, and c for a next dependent endpoint of the discovered dependent endpoints.

5. The method of claim 4, wherein decommissioning the old certificate from the endpoint comprises:
decommissioning the old certificate from the endpoint when the dependency count is zero.

6. The method of claim 1, further comprising:
taking a snapshot of the endpoint along with the old certificate substantially upon receiving the certificate replacement request and prior to placing the new certificate in the endpoint; and
instantiate a recovery of the endpoint with the old certificate by reverting the snapshot when the certificate replacement request fails.

7. The method of claim 1, wherein each of the endpoint and the dependent endpoints is a software defined data center (SDDC) component, and wherein the endpoint and the dependent endpoints are to run in a same management node or different management nodes.

8. The method of claim 1, wherein each of the old certificate and the new certificate is a digital certificate, wherein the digital certificate is a Secure Sockets Layer (SSL) certificate or a Transport Layer Security (TLS) certificate, and wherein the certificate replacement request for the endpoint is received via a Representational State Transfer (REST) or Simple Object Access Protocol (SOAP) Application Programming Interface (API) call.

9. A certificate management node comprising:
a processor; and
a memory coupled to the processor, wherein the memory comprises a seamless certificate management unit to:
receive a certificate replacement request for an endpoint in a hyperconverged infrastructure;
place a new certificate in the endpoint upon receiving the certificate replacement request such that the endpoint includes an old certificate and the new certificate;
discover and monitor one or more dependent endpoints having communication with the endpoint using the old certificate;
place the new certificate in the discovered dependent endpoints;
establish a trust between the endpoint and each of the discovered dependent endpoints using the new certificate via placing the new certificate in the discovered dependent endpoints;
maintain existing communication between the endpoint and each of the discovered dependent endpoints using the old certificate;
upon completion of the existing communication, enable next communication between the endpoint and each of the discovered dependent endpoints using the new certificate; and
decommission the old certificate from the endpoint and the discovered dependent endpoints.

10. The certificate management node of claim 9, wherein the seamless certificate management unit is to:
dynamically create and maintain a certificate dependency table based on discovering and monitoring of the one or more dependent endpoints, the certificate dependency table is to include:
dependency information between the endpoint and the discovered dependent endpoints using the old certificate; and
a dependency count including a number of the discovered dependent endpoints that are communicating with the endpoint with the old certificate.

11. The certificate management node of claim 10, wherein the seamless certificate management unit is to:
determine the completion of the existing communication between the endpoint and each of the discovered dependent endpoints using the certificate dependency table; and
enable the next communication between the endpoint and each of the discovered dependent endpoints using the new certificate upon completion of the existing communication.

12. The certificate management node of claim 10, wherein the seamless certificate management unit is to:
a. determine that the existing communication between the endpoint and a first dependent endpoint of the discovered dependent endpoints using the old certificate is completed based on the monitoring;
b. update the dependency count in the certificate dependency table and enable the next communication between the endpoint and the first dependent endpoint using the new certificate upon determining that the existing communication between the endpoint and the first dependent endpoint is completed, wherein the old certificate can be decommissioned from the first dependent endpoint; and
c. determine whether the updated dependency count becomes zero; and when the dependency count is greater than zero, repeat the steps a, b, and c for a next dependent endpoint of the discovered dependent endpoints.

13. The certificate management node of claim 12, wherein the seamless certificate management unit is to:
decommission the old certificate from the endpoint when the dependency count is zero.

14. The certificate management node of claim 9, wherein the endpoint and the dependent endpoints are software defined data center (SDDC) components running in different management nodes, and wherein the management nodes comprise virtual machines, containers, physical servers, or any combination thereof.

15. A non-transitory machine-readable storage medium encoded with instructions that, when executed by a processor cause the processor to:
receive a certificate replacement request for an endpoint in a hyperconverged infrastructure;
place a new certificate in the endpoint upon receiving the certificate replacement request such that the endpoint includes an old certificate and the new certificate;
discover and monitor one or more dependent endpoints having communication with the endpoint using the old certificate;
place the new certificate in the dependent endpoints;
establish a trust between the endpoint and each of the dependent endpoints using the new certificate via placing the new certificate in the dependent endpoints;
maintain existing communication between the endpoint and each of the dependent endpoints using the old certificate;
upon completion of the existing communication, enabling next communication between the endpoint and each of the dependent endpoints using the new certificate; and
decommission the old certificate from the endpoint and the dependent endpoints.

16. The non-transitory machine-readable storage medium of claim 15, further comprising instructions to:
dynamically create and maintain a certificate dependency table based on discovering and monitoring of the one or more dependent endpoints, the certificate dependency table is to include:
dependency information between the endpoint and the discovered dependent endpoints using the old certificate; and
a dependency count including a number of the discovered dependent endpoints that are communicating with the endpoint with the old certificate.

17. The certificate management node of claim 16, wherein instructions to enable the next communication between the endpoint and each of the discovered dependent endpoints using the new certificate comprises instructions to:
a. determine that the existing communication between the endpoint and a first dependent endpoint of the discovered dependent endpoints using the old certificate is completed based on the monitoring;
b. update the dependency count in the certificate dependency table and enable the next communication between the endpoint and the first dependent endpoint using the new certificate upon determining that the existing communication between the endpoint and the first dependent endpoint is completed, wherein the old certificate can be decommissioned from the first dependent endpoint; and
c. determine whether the updated dependency count becomes zero; and when the dependency count is greater than zero, repeat the steps of a, b, and c for a next dependent endpoint of the discovered dependent endpoints.

18. The certificate management node of claim 17, wherein instructions to decommission the old certificate from the endpoint comprises instructions to:
decommission the old certificate from the endpoint when the dependency count is zero.

* * * * *